Patented Mar. 29, 1932

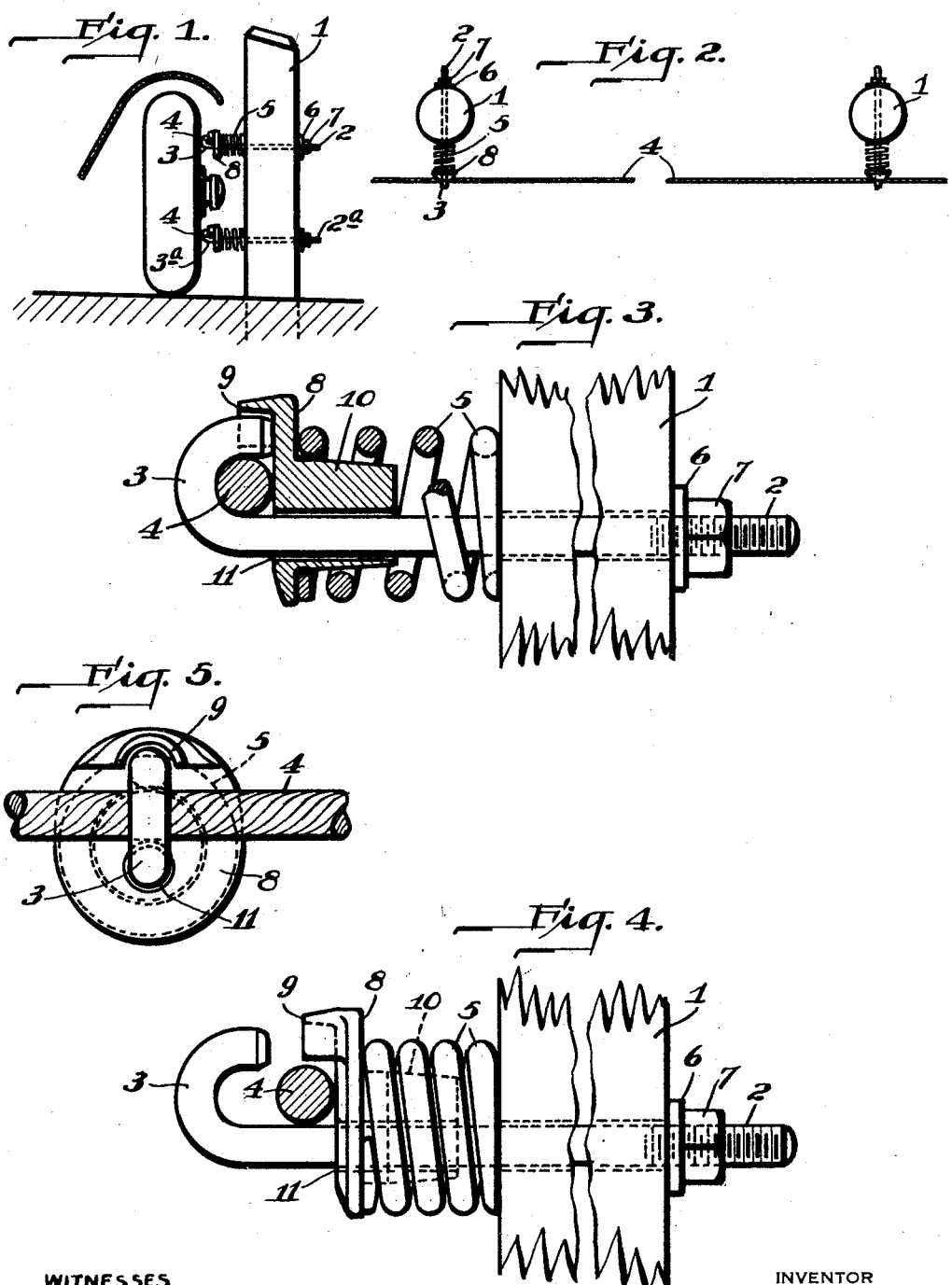

1,851,735

UNITED STATES PATENT OFFICE

GEORGE S. SMITH, OF PITTSBURGH, PENNSYLVANIA, ASSIGNOR TO PITTSBURGH SCREW & BOLT CORPORATION, OF PITTSBURGH, PENNSYLVANIA, A CORPORATION OF PENNSYLVANIA

CABLE SUPPORT FOR HIGHWAY BARRIERS

Application filed April 4, 1931. Serial No. 527,624.

This invention relates to guard-barriers for highways, and particularly to barriers having resilient cable supporting means of the type shown in Patent No. 1,797,522. Such supports comprise a hook arm extending from a barrier post, and a spring normally holding a cable in the hook, away from the post, adapted to absorb and distribute shock from an impinging vehicle.

It is desirable that highway barriers should deflect an impinging vehicle into the highway, and should minimize damage by warding the hub or rim of wheels from the barrier posts.

In the form of cable support described in the above-mentioned patent, certain defects sometimes arise. That form of support is shown as a J-bolt extending from a barrier post, with a helical spring interposed between the post and the hook end of the bolt to hold a vehicle-deflecting cable in the terminal hook away from the post. But with blows from automobiles at high speed and from heavy trucks, sometimes the spring is compressed so far that the cable slips out of the hook and falls from its support to the ground.

An object of the present invention is to provide positive means to prevent release of the cable from the terminal hook of a J-bolt support by vehicle impact on the cable. Another object is to strengthen such bolts against bending under a blow. Another object is to distribute stresses effectively and uniformly against a spring surrounding such bolt. Another object is to embody these improvements in elements that may be added economically and quickly to existing J-bolt supports.

Referring to the accompanying drawings, illustrating a preferred embodiment of this invention, Fig. 1 is a side elevation of a barrier post and two resilient barrier-cable supports of the J-bolt type embodying the invention claimed herein and showing the spaced relation of the barrier to an impinging vehicle wheel; Fig. 2 is a plan view of a portion of the barrier showing two adjacent posts with a cable supported therebetween by this improved resilient support; Fig. 3 is an enlarged side view of a portion of a post and of one of the resilient cable-holding units in normally extended position; Fig. 4 is a view similar to Fig. 3 but with the spring compressed; Fig. 5 is an end view of one of the supports with a cable held within a J-bolt hook by the end plate of this invention.

Referring to Figs. 1 and 3, this invention is illustrated as applied to a barrier post 1 having two vertically spaced cable supporting members consisting of J-bolts 2 and 2a extending through the post and having terminal hook ends 3 and 3a respectively on the road side of the post. Wire barrier cables 4 are carried in the hooks. Between each cable and the post and surrounding the shank of each bolt is positioned a helical spring 5. Both ends of spring 5 are preferably bent substantially into planes perpendicular to the axis of the spring. The threaded end of each bolt behind the post carries a washer 6 and a nut 7, by which the bolt may be taken up to compress spring 5 as desired.

The inner dimensions of each hook are such as to provide clearance for holding the cable loosely therein. Some slippage of the cable through the hooks is preferable so that sudden stresses may be transmitted by the cable to several posts.

A guard member 8, which may be a forging or casting, is positioned between the helical spring and the opening of the J-bolt hook, retained by the spring, and having a U-shaped boss or guide portion 9 extending around the outer portion of the free end of the hook. Guard member 8 has an integral tapered body 10, adapted to snugly fit into spring 5. A bore 11 in the body receives the shank of J-bolt 2. This bore is eccentric in the body and is opposite to guide boss 9. This makes for compactness and centralizes stresses from cable 4 against spring 5.

When a vehicle strikes a cable held in this support, guard member 8 is pushed back, compressing spring 5 so that a resilient push-back effect is exerted against the vehicle. Since the amount of play is normally not great, the free end of the hook is usually retained in the guide 9. Even with relatively extensive movement of guard 8, as shown in Fig. 4, the cable is prevented from jumping out of the hook by guide 9 which acts as a retainer against any upward movement of the cable. Since the driving force on the cable is inward, it is securely held between the boss 9 and the bolt body regardless of whether there may also be an upward or downward thrust on it. A gap wider than one-half the cable diameter must be opened between the ends of the hook and of the guide before the cable can escape, and even with such a gap escape is unlikely, due to guide boss 9 engaging the upper side of the cable at all times.

With the body portion 10 disposed inside the spring, a support is provided along the shank of bolt 2 which helps to prevent bending of the bolt under impact on the cable. The taper of the body 10 serves to help hold it firmly in engagement with the spring and permits quick assembly.

According to the provisions of the patent statutes, I have explained my invention and have illustrated and described what I now consider to represent its best embodiment. However, I desire to have it understood that, within the scope of the appended claims, the invention may be practiced otherwise than as specifically shown and described.

I claim:

1. The combination of a roadway barrier post, a J-bolt affixed to said post with its hook spaced therefrom toward the road, a vehicle-deflecting cable disposed in said hook, and a spring disposed about said J-bolt between said post and cable and adapted to yield under stress from vehicle impact against said cable, a guard member interposed between said spring and the opening of said J-bolt hook, said member being retained by said spring and having a guide portion extending along the free end of said hook to prevent escape of said cable from said hook.

2. A roadway barrier comprising a barrier post, a J-bolt affixed thereto, a helical spring supported by the shank of said bolt and holding the hook thereof spaced from said post for sustaining a vehicle deflecting cable against impact, a guard member interposed between said J-bolt hook and the outer end of said spring, said member encircling the shank of said bolt and seated against said spring, and having a guide portion enclosing the free end of said hook to prevent escape of said cable from said hook.

3. In a roadway barrier-cable support, comprising a J-bolt and a helical spring disposed about the shank of said bolt, a guard member interposed between said spring and said J-bolt hook, said member being eccentrically mounted on the shank of said bolt and slidably supported thereby and having an open guide boss extending around the free end of said hook to prevent escape of said cable from said hook.

4. In a roadway barrier-cable support, comprising a J-bolt and a helical spring disposed about the shank of said hook, a guard member interposed between said spring and said J-bolt hook, said member being eccentrically mounted on the shank of said bolt and supported thereby to prevent escape of said cable from said hook, a guide boss enclosing the free end of said hook and opening inwardly of said hook.

5. In a roadway barrier-cable support, comprising a J-bolt and a helical spring disposed about the shank of said bolt, a guard member mounted on the shank of said bolt and having a guiding boss slidably enclosing the free end of said hook to obstruct escape of said cable from said hook, said member having an integral tapered body extending into said helical spring.

In testimony whereof, I sign my name.

GEORGE S. SMITH.